United States Patent
Yamazato

(10) Patent No.: US 12,258,019 B2
(45) Date of Patent: Mar. 25, 2025

(54) MOBILITY SERVICE MANAGEMENT SYSTEM

(71) Applicant: TOYOTA JIDOSHA KABUSHIKI KAISHA, Toyota (JP)

(72) Inventor: Narihito Yamazato, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 259 days.

(21) Appl. No.: 17/662,373

(22) Filed: May 6, 2022

(65) Prior Publication Data
US 2022/0355798 A1 Nov. 10, 2022

(30) Foreign Application Priority Data
May 7, 2021 (JP) .................................. 2021-079275

(51) Int. Cl.
*B60W 30/18* (2012.01)

(52) U.S. Cl.
CPC ... *B60W 30/18109* (2013.01); *B60W 2510/18* (2013.01); *B60W 2510/20* (2013.01); *B60W 2554/4041* (2020.02)

(58) Field of Classification Search
CPC ....... B60W 30/18109; B60W 2510/18; B60W 2510/20; B60W 2554/4041; G06Q 50/40; G06Q 10/02; G06F 16/2379; G06F 16/2455; G06F 16/29
See application file for complete search history.

(56) References Cited

U.S. PATENT DOCUMENTS

| | | |
|---|---|---|
| 2020/0019906 A1 | 1/2020 | Sugiyama et al. |
| 2020/0175429 A1* | 6/2020 | Beaurepaire ........... G06Q 10/02 |
| 2020/0356906 A1 | 11/2020 | Yoshinaga |
| 2021/0103896 A1* | 4/2021 | Diehl ................. G06Q 10/1095 |
| 2021/0163040 A1 | 6/2021 | Kojo |

FOREIGN PATENT DOCUMENTS

| | | |
|---|---|---|
| JP | 2018156641 A | 10/2018 |
| JP | 2018206187 A | 12/2018 |
| JP | 2020-009320 A | 1/2020 |
| JP | 2020087316 A | 6/2020 |
| JP | 2020-184220 A | 11/2020 |
| JP | 2021-043058 A | 3/2021 |
| WO | 2019220205 A1 | 11/2019 |

* cited by examiner

*Primary Examiner* — Jacob M Amick
*Assistant Examiner* — Charles J Brauch
(74) *Attorney, Agent, or Firm* — Dickinson Wright, PLLC

(57) ABSTRACT

A mobility service management system manages a mobility service utilizing a mobility service vehicle that runs via a stop position. A stop position reservation database indicates a reservation status of each stop position. A reservation request includes a target stop position and a target stop time specified by a user. The mobility service management system determines, based on the stop position reservation database, whether the target stop position is available in a target stop period including the target stop time. When the target stop position is available in the target stop period, the mobility service management system reserves the target stop position in the target stop period for a first mobility service vehicle assigned to the user. The first mobility service vehicle runs in accordance with a first operation pattern that arrives and stops at the target stop position within the reserved target stop period.

6 Claims, 12 Drawing Sheets

<STOP POSITION RESERVATION DATABASE 200>

| STOP POSITION STa | | STOP POSITION STb | | ... |
|---|---|---|---|---|
| ⋮ | ⋮ | ⋮ | ⋮ | |
| 14:40~14:42 | 10-A | 11:15~11:17 | 10-D | |
| 14:43~14:45 | 10-B | 11:52~11:54 | 10-E | |
| 14:54~14:56 | 10-C | 12:20~12:22 | 10-F | |
| ⋮ | ⋮ | ⋮ | ⋮ | |

*FIG. 3*

MOBILITY SERVICE MANAGEMENT SYSTEM

CROSS-REFERENCE TO RELATED APPLICATION

This application claims priority to Japanese Patent Application No. 2021-079275 filed on May 7, 2021, the entire contents of which are incorporated by reference herein.

BACKGROUND

Technical Field

The present disclosure relates to a technique of managing a mobility service utilizing a mobility service vehicle.

Background Art

Patent Literature 1 discloses an operation management system that manages an operation of an on-demand type vehicle. The operation management system has travel time information that indicates travel times between stop positions in units of month, day, and time. The operation management system generates an operation schedule according to user's demand, and calculates an arrival time of the vehicle at each stop position based on specific travel time information related to a scheduled operation date and time.

Patent Literature 2 discloses a vehicle dispatch system that dispatches a vehicle in response to a vehicle dispatch request from a user. The vehicle dispatch system calculates pick-up/drop-off position candidates around a user's requested point, and calculates a total trip time for each of the pick-up/drop-off position candidates. Then, the vehicle dispatch system determines an optimum pick-up/drop-off position among the pick-up/drop-off position candidates based on the total trip time.

Patent Literature 3 discloses a vehicle operation management system that manages a vehicle parked in a parking lot. When there is an instruction to a parked vehicle to come to a boarding area, the vehicle operation management system makes the vehicle move from a parking space to the boarding area in a time corresponding to an empty space in the boarding area.

Patent Literature 4 discloses a service that transports a person to a predetermined destination by utilizing a moving body such as a vehicle. A stop position determination device measures a required time from start to end of user's boarding to the vehicle. Then, the stop position determination device determines, based on the required time, a target stop position from among a plurality of stop positions located in the vicinity of the destination.

LIST OF RELATED ART

Patent Literature 1: Japanese Laid-Open Patent Application Publication No. JP-2020-87316
Patent Literature 2: International Publication WO2019/220205
Patent Literature 3: Japanese Laid-Open Patent Application Publication No. JP-2018-156641
Patent Literature 4: Japanese Laid-Open Patent Application Publication No. JP-2018-206187

SUMMARY

A mobility service utilizing a mobility service vehicle that runs via a predetermined stop position is considered. When picking up or dropping off a user, the mobility service vehicle stops at a stop position. However, at a timing when a certain mobility service vehicle comes to near a stop position, there is a possibility that another mobility service vehicle is being stopped at the stop position. In that case, the mobility service vehicle need to wait in front of the stop position until the stop position becomes available. This hinders a smooth operation of the mobility service vehicle.

An object of the present disclosure is to provide a technique that can smoothen a mobility service utilizing a mobility service vehicle that runs via a predetermined stop position.

An aspect of the present disclosure is directed to a mobility service management system that manages a mobility service utilizing a mobility service vehicle.

The mobility service vehicle runs via at least one predetermined stop position.

The mobility service management system includes:
one or more processors; and
a stop position reservation database indicating a reservation status of each of the at least one predetermined stop position.

The one or more processors receive a reservation request including a target stop position and a target stop time that are specified by a user of the mobility service.

The one or more processors determine, based on the reservation request, a first mobility service vehicle that delivers the mobility service to the user.

The one or more processors determine, based on the stop position reservation database, whether or not the target stop position is available in a first target stop period including the target stop time.

When the target stop position is available in the first target stop period, the one or more processors reserve the target stop position in the first target stop period and update the stop position reservation database.

The one or more processors instruct the first mobility service vehicle to run in accordance with a first operation pattern that arrives and stops at the target stop position within the first target stop period reserved.

According to the aspect of the present disclosure, the mobility service management system includes the stop position reservation database. The mobility service management system determines, based on the stop position reservation database, whether or not the target stop position is available in the first target stop period including the target stop time. When the target stop position is available in the first target stop period, the target stop position in the first target stop period is reserved for the first mobility service vehicle. Therefore, the first mobility service vehicle is able to smoothly access and stop at the target stop position without waiting in front of the target stop position. That is, a smooth operation of the first mobility service vehicle is realized. In addition, since the first mobility service vehicle does not need to wait in front of the target stop position, a disturbance of a surrounding traffic flow is suppressed.

BRIEF DESCRIPTION OF DRAWINGS

FIG. 3 is a conceptual diagram showing an example of a stop position reservation database according to an embodiment of the present disclosure;

EMBODIMENTS

Embodiments of the present disclosure will be described with reference to the accompanying drawings.

1. Outline

Figure 1:
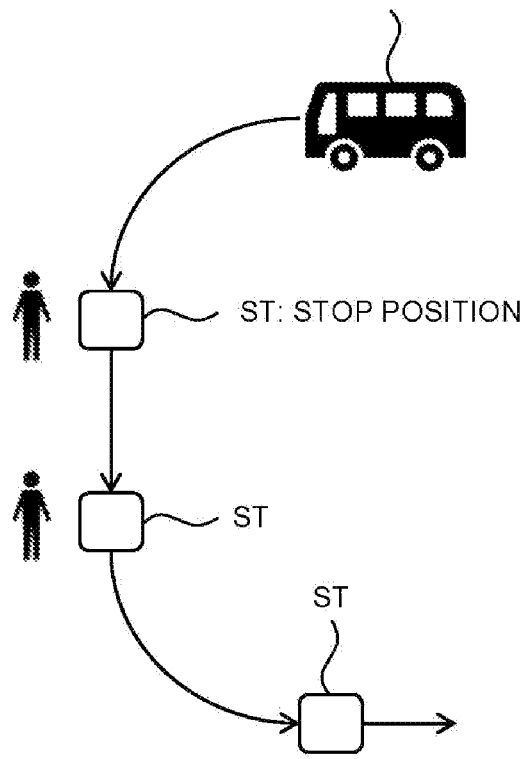
FIG. 1 is a conceptual diagram for explaining an outline of a mobility service system according to an embodiment of the present disclosure.

FIG. 1 is a conceptual diagram for explaining an outline of a mobility service system 1 according to the present embodiment. The mobility service is a service that delivers "mobility" to a user. The mobility service system 1 delivers the mobility service to the user by utilizing a mobility service vehicle 10. Typically, a plurality of mobility service vehicles 10 are utilized in one service area.

The mobility service vehicle 10 is a vehicle that runs with a user of the mobility service. The mobility service vehicle 10 may also be referred to as a MaaS (Mobility as a Service) vehicle. The mobility service vehicle 10 may be an automated driving vehicle that travels autonomously or a vehicle driven by a driver.

In the present embodiment, the mobility service vehicle 10 runs (travels) via at least one predetermined stop position ST. Examples of the predetermined stop position ST include a bus stop, an on-road parking, a road shoulder space where stopping is not prohibited, a carriage porch (e.g., a hotel, a station, an airport, etc.), and the like. When picking up or dropping off a user, the mobility service vehicle 10 stops at the stop position ST. It should be noted that the mobility service vehicle 10 may pass the stop position ST where no user gets on or off. "Running via the stop position ST" is a concept including not only "stopping at the stop position ST" but also "passing through the stop position ST."

For example, the mobility service vehicle 10 is a semi-demand vehicle whose operation pattern (i.e., an operation route and an operation schedule) can be flexibly changed. In the case of the semi-demand vehicle, it is possible to flexibly change the operation pattern according to a request from the user or the like, although the stop position ST via which the semi-demand vehicle travels is predetermined. The semi-demand vehicle is exemplified by a semi-demand bus. As another example, the mobility service vehicle 10 may be a public transportation bus whose operation pattern is determined. As yet another example, the mobility service vehicle 10 may be a shuttle bus for an accommodation facility, a commercial facility, an entertainment facility, and the like. As yet another example, the mobility service vehicle 10 may be a ride-sharing vehicle.

Figure 2:
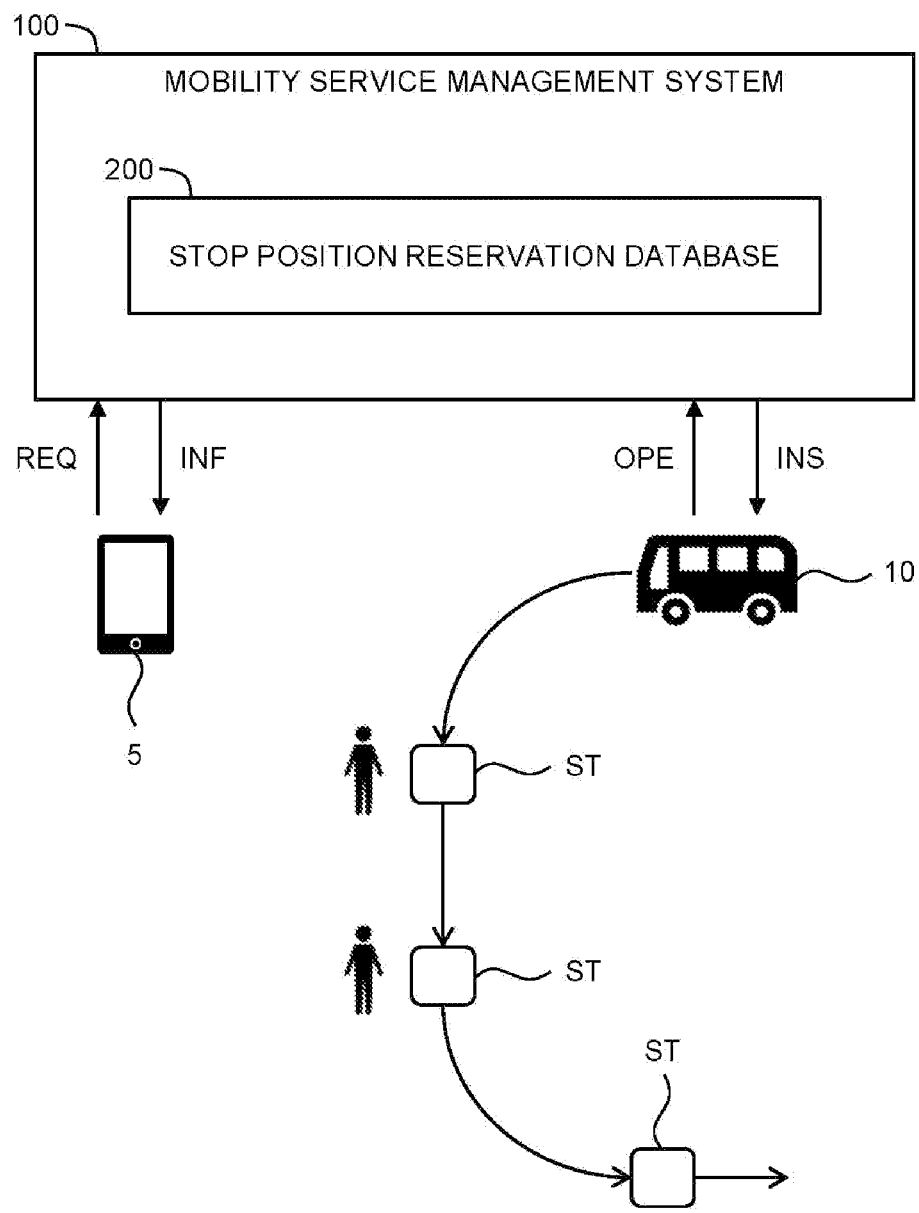
FIG. 2 is a conceptual diagram for explaining an outline of a mobility service management system according to an embodiment of the present disclosure.

FIG. 2 is a conceptual diagram for explaining an outline of a mobility service management system 100 according to the present embodiment. The mobility service management system 100 manages the mobility service. For example, the management of the mobility service includes acceptance of a reservation for the mobility service, dispatch of the mobility service vehicle 10, and the like. The management of the mobility service may include generation and management of an operation pattern of the mobility service vehicle 10, monitoring of an operation status of the mobility service vehicle 10, and the like. The management of the mobility service may include management of the users, delivery of information to the users, and the like.

The mobility service vehicle 10 and the mobility service management system 100 are capable of communicating with each other. For example, the mobility service vehicle 10 transmits operation status information OPE indicating its own operation status to the mobility service management system 100. The operation status information OPE includes a current position, a vehicle speed, and the like of the mobility service vehicle 10. The mobility service management system 100 can monitor the operation status of each mobility service vehicle 10 based on the operation status information OPE.

Moreover, the mobility service management system 100 is capable of communicating with a user terminal 5 operated by a user of the mobility service. Examples of the user terminal 5 include a smartphone, a PC, and the like. The mobility service management system 100 can deliver various kinds of service information INF to the user terminal 5.

A basic flow when a certain user X utilizes the mobility service is as follows.

The user X operates the user terminal 5 to specify a desired stop position ST and a desired date and time (date and time) at which the user X gets on or off. The stop position ST specified (desired) by the user X is hereinafter referred to as a "target stop position STx." The date and time specified (desired) by the user X is hereinafter referred to as a "target stop time Tx." The user terminal 5 transmits a "reservation request REQ" including at least the target stop position STx and the target stop time Tx to the mobility service management system 100.

The mobility service management system 100 receives the reservation request REQ from the user terminal 5. Based on the reservation request REQ, the mobility service management system 100 determines (assigns) a mobility service vehicle 10 that delivers the mobility service to the user X. The mobility service vehicle 10 that delivers the mobility service to the user X is hereinafter referred to as a "first mobility service vehicle 10-1." The first mobility service vehicle 10-1 is a mobility service vehicle 10 that is capable of arriving at the target stop position STx by the target stop time Tx. The mobility service management system 100 may assign the first mobility service vehicle 10-1 from among the mobility service vehicles 10 being already in operation, or may newly assign the first mobility service vehicle 10-1.

An operation pattern of the first mobility service vehicle 10-1 is hereinafter referred to as a "first operation pattern PAT1." The first operation pattern PAT1 includes the stop position ST via which the first mobility service vehicle 10-1 must run and a target stop time at each stop position ST. Therefore, the first operation pattern PAT1 includes at least the target stop position STx and the target stop time Tx that are specified by the user X. The first operation pattern PAT1 may further include an operation route of the first mobility service vehicle 10-1. The first operation pattern PAT1 may include a target vehicle speed of the first mobility service vehicle 10-1.

The mobility service management system 100 communicates with the first mobility service vehicle 10-1 to transmits an "operation pattern instruction INS" to the first mobility service vehicle 10-1. The operation pattern instruction INS includes the first operation pattern PAT1 and instructs the first mobility service vehicle 10-1 to run in accordance with the first operation pattern PAT1.

The first mobility service vehicle 10-1 receives the operation pattern instruction INS from the mobility service management system 100. Then, the first mobility service vehicle 10-1 runs in accordance with the first operation pattern PAT1 included in the operation pattern instruction INS. For example, in a case where the first mobility service vehicle 10-1 is an automated driving vehicle, the first mobility service vehicle 10-1 performs automated driving control so as to travel in accordance with the first operation pattern PAT1. As another example, in a case of manual driving, the first mobility service vehicle 10-1 presents the first operation pattern PAT1 to a driver. The driver drives the first mobility service vehicle 10-1 so as to travel in accordance with the first operation pattern PAT1.

The first mobility service vehicle 10-1 stops at the target stop position STx in accordance with the first operation pattern PAT1. At the target stop position STx, the user X gets on the first mobility service vehicle 10-1 or gets off the first mobility service vehicle 10-1.

However, at the timing when the first mobility service vehicle 10-1 comes to near the target stop position STx, there is a possibility that another mobility service vehicle 10 is being stopped at the target stop position STx. In that case, the first mobility service vehicle 10-1 need to wait in front of the target stop position STx until the target stop position STx becomes available. This hinders a smooth operation of the first mobility service vehicle 10-1. In addition, this may lead to a disturbance of a surrounding traffic flow. Furthermore, this may cause a decrease in the user X's satisfaction level with the mobility service.

In view of the above, according to the present embodiment, each stop position ST is used in a reservation-based manner in order to further smoothen the operation of the mobility service vehicle 10. The mobility service management system 100 manages the reservation of each stop position ST. More specifically, the mobility service management system 100 includes a "stop position reservation database 200" that indicates a reservation status of each stop locations ST utilized in the mobility service.

FIG. 3 is a conceptual diagram showing an example of the stop position reservation database 200. The stop position reservation database 200 indicates the reservation status for each stop position ST (STa, STb, . . . ). For example, the reservation status is represented by a combination of a reservation time (reserved time) and the mobility service vehicle 10 having the reservation. The reservation time has a certain time width (e.g., 2 minutes).

In response to the reservation request REQ from the user X, the mobility service management system 100 determines, based on the stop position reservation database 200, whether or not the target stop position STx is available (vacant) at the target stop time Tx. More specifically, the mobility service management system 100 sets a "first target stop period PS1" in which the first mobility service vehicle 10-1 may stop at the target stop position STx. The first target stop period PS1 is a certain period (e.g., 1 to 2 minutes) including the target stop time Tx. Based on the stop position reservation database 200, the mobility service management system 100 determines whether or not the target stop position STx is available (vacant) in the first target stop period PS1.

When the target stop position STx is available in the first target stop period PS1, the mobility service management system 100 reserves the target stop position STx in the first target stop period PS1 for the first mobility service vehicle 10-1. The mobility service management system 100 reflects the reservation in the stop position reservation database 200 to update the stop position reservation database 200. At this time, the first target stop period PS1 is registered as the reservation (reserved) time in the stop position reservation database 200.

The first operation pattern PAT1 is set such that the first mobility service vehicle 10-1 arrives and stops at the target stop position STx within the first target stop period PS1 reserved. For example, the first operation pattern PAT1 is set such that the first mobility service vehicle 10-1 arrives and stops at the target stop position STx at the target stop time Tx. The mobility service management system 100 transmits the operation pattern instruction INS instructing the first operation pattern PAT1 to the first mobility service vehicle 10-1.

The first mobility service vehicle 10-1 runs in accordance with the first operation pattern PAT1. The target stop position STx in the first target stop period PSI including the target stop time Tx is reserved for the first mobility service vehicle 10-1. Therefore, the first mobility service vehicle 10-1 is able to smoothly access and stop at the target stop position STx without waiting in front of the target stop position STx. That is, smooth operation of the first mobility service vehicle 10-1 is realized. In addition, since the first mobility service vehicle 10-1 does not need to wait in front of the target stop position STx, a disturbance of a surrounding traffic flow is suppressed. Furthermore, the user X's satisfaction level with the smooth mobility service is increased.

In urban areas being tight on land, it is not easy to secure the stop position ST dedicated only to the mobility service vehicle 10. In addition, a shared use of a public bus stop is not always permitted. Therefore, it is supposed that the number of stop positions ST that can be secured in the urban areas is limited. It is also supposed that a space of an individual stop position ST is not large. Meanwhile, it is supposed that a large number of mobility service vehicles 10 will run in the urban areas. Therefore, it is anticipated that competitions for the limited number of stop positions ST are likely to occur between the mobility service vehicles 10. According to the present embodiment, the reservation-based stop position ST makes it possible to avoid the competition and to realize the smooth mobility service.

Hereinafter, the mobility service vehicle 10 and the mobility service management system 100 according to the present embodiment will be described in more detail.

2. Mobility Service Vehicle

2-1. Configuration Example

Figure 4:
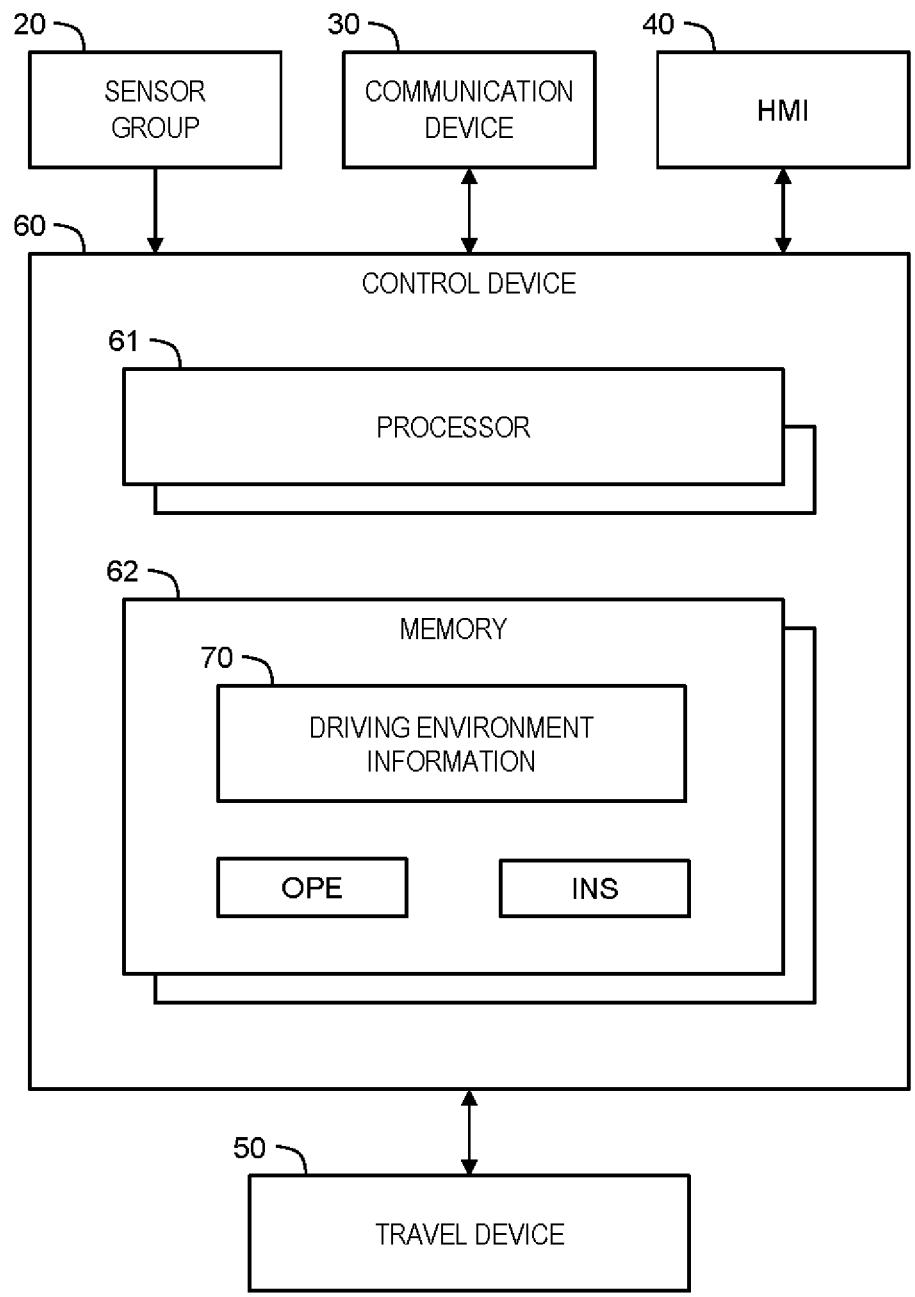
FIG. 4 is a block diagram showing a configuration example of a mobility service vehicle according to an embodiment of the present disclosure.

FIG. 4 is a block diagram showing a configuration example of the mobility service vehicle 10 according to the present embodiment. The mobility service vehicle 10 includes a sensor group 20, a communication device 30, a travel device 50, and a control device 60. The mobility service vehicle 10 driven by the driver may further include an HMI (Human Machine Interface) 40.

The sensor group 20 includes a vehicle state sensor that detects a state of the mobility service vehicle 10. The vehicle state sensor includes a speed sensor, an acceleration sensor, a yaw rate sensor, a steering angle sensor, and the like. The sensor group 20 also includes a position sensor that detects a position and an orientation of the mobility service vehicle 10. The position sensor is exemplified by a GPS (Global Positioning System) sensor. Moreover, the sensor group 20 includes a recognition sensor that recognizes (detects) a situation around the mobility service vehicle 10. Examples of the recognition sensor include a camera, a LIDAR(Laser Imaging Detection and Ranging), a radar, and the like.

The communication device 30 communicates with the outside of the mobility service vehicle 10. For example, the communication device 30 communicates with the mobility service management system 100.

The HMI 40 is an user interface for delivering information to the driver and for receiving information from the driver. Examples of the HMI 40 include a display, a touch panel, a head-up display, and the like.

The travel device 50 includes a steering device, a driving device, and a braking device. The steering device turns wheels. For example, the steering device includes an electric power steering (EPS) device. The driving device is a power source that generates a driving force. Examples of the drive device include an engine, an electric motor, an in-wheel motor, and the like. The braking device generates a braking force.

The control device (controller) 60 controls the mobility service vehicle 10. The control device 60 includes one or more processors 61 (hereinafter simply referred to as a processor 61) and one or more memories 62 (hereinafter simply referred to as a memory 62). The processor 61 executes a variety of processing. For example, the processor 61 includes a CPU (Central Processing Unit). The memory 62 stores a variety of information. Examples of the memory 62 include a volatile memory, a non-volatile memory, an HDD (Hard Disk Drive), an SSD (Solid State Drive), and the like. The variety of processing by the processor 61 (the control device 60) is implemented by the processor 61 executing a control program being a computer program. The control program is stored in the memory 62 or recorded on a non-transitory computer-readable recording medium. The control device 60 may include one or more ECUs (Electronic Control Units).

2-2. Driving Environment Information

The control device 60 (the processor 61) uses the sensor group 20 to acquire driving environment information 70 indicating a driving environment for the mobility service vehicle 10. The driving environment information 70 includes vehicle state information, vehicle position information, and surrounding situation information. The vehicle state information indicates a vehicle state (e.g., the vehicle speed, etc.) detected by the vehicle state sensor. The vehicle position information indicates the position and the orientation of the mobility service vehicle 10 detected by the position sensor. The surrounding situation information indicates a result of recognition by the recognition sensor. For example, the surrounding situation information includes an image captured by the camera. The surrounding situation information may include object information regarding an object around the mobility service vehicle 10. Examples of the object around the mobility service vehicle 10 include a pedestrian, another vehicle (e.g., a preceding vehicle, a parked vehicle, etc.), a sign, a white line, a roadside structure, and the like. The object information indicates a relative position and a relative velocity of the object with respect to the mobility service vehicle 10. The driving environment information 70 is stored in the memory 62.

2-3. Communication Process

The control device 60 (the processor 61) communicates with the mobility service management system 100 through the communication device 30.

For example, the processor 61 transmits the operation status information OPE to the mobility service management system 100 through the communication device 30. The operation status information OPE indicates the operation status of the mobility service vehicle 10. The operation status information OPE includes a part of the driving environment information 70 described above. For example, the operation status information OPE indicates the current position of the mobility service vehicle 10. In addition, the operation status information OPE may indicate the vehicle speed of the mobility service vehicle 10. Furthermore, the operation status information OPE includes an expected arrival time at which the mobility service vehicle 10 arrives at the stop position ST. The expected arrival time is calculated, for example, based on the current position, the vehicle speed, and the stop position ST. In calculating the expected arrival time, traffic jam information provided from a traffic information center may be taken into consideration.

Moreover, the processor 61 receives the operation pattern instruction INS from the mobility service management system 100 through the communication device 30. The operation pattern instruction INS indicates the operation pattern that the mobility service vehicle 10 must follow. The operation pattern includes at least the stop position ST via which the mobility service vehicle 10 must run and the target stop time at each stop position ST. The operation pattern may further include an operation route of the mobility service vehicle 10. The operation pattern may further include a target vehicle speed of the mobility service vehicle 10.

2-4. Information Delivery Process

The control device 60 (the processor 61) delivers necessary information to the driver through the HMI 40. For example, the processor 61 presents the operation pattern indicated by the operation pattern instruction INS to the driver. For example, the processor 61 displays the operation pattern on the display.

2-5. Vehicle Travel Control

The control device 60 (the processor 61) executes vehicle travel control that controls travel of the mobility service vehicle 10. The vehicle travel control includes steering control, acceleration control, and deceleration control. The processor 61 executes the vehicle travel control by controlling the travel device 50 (the steering device, the driving device, and the braking device).

The processor 61 may execute automated driving control. In this case, the processor 61 executes the vehicle travel control such that the mobility service vehicle 10 automatically travels in accordance with the operation pattern indicated by the operation pattern instruction INS. The operation route may be determined by the processor 61. The processor 61 generates a target trajectory of the mobility service vehicle 10 based on the operation pattern including the operation route and the above-described driving environment information 70. The target trajectory includes a target position and a target velocity. Then, the processor 61 executes the vehicle travel control such that the mobility service vehicle 10 follows the target trajectory.

In the case of manual driving, the processor 61 executes the vehicle travel control in accordance with a driving operation performed by the driver.

3. Mobility Service Management System

3-1. Configuration Example

Figure 5:
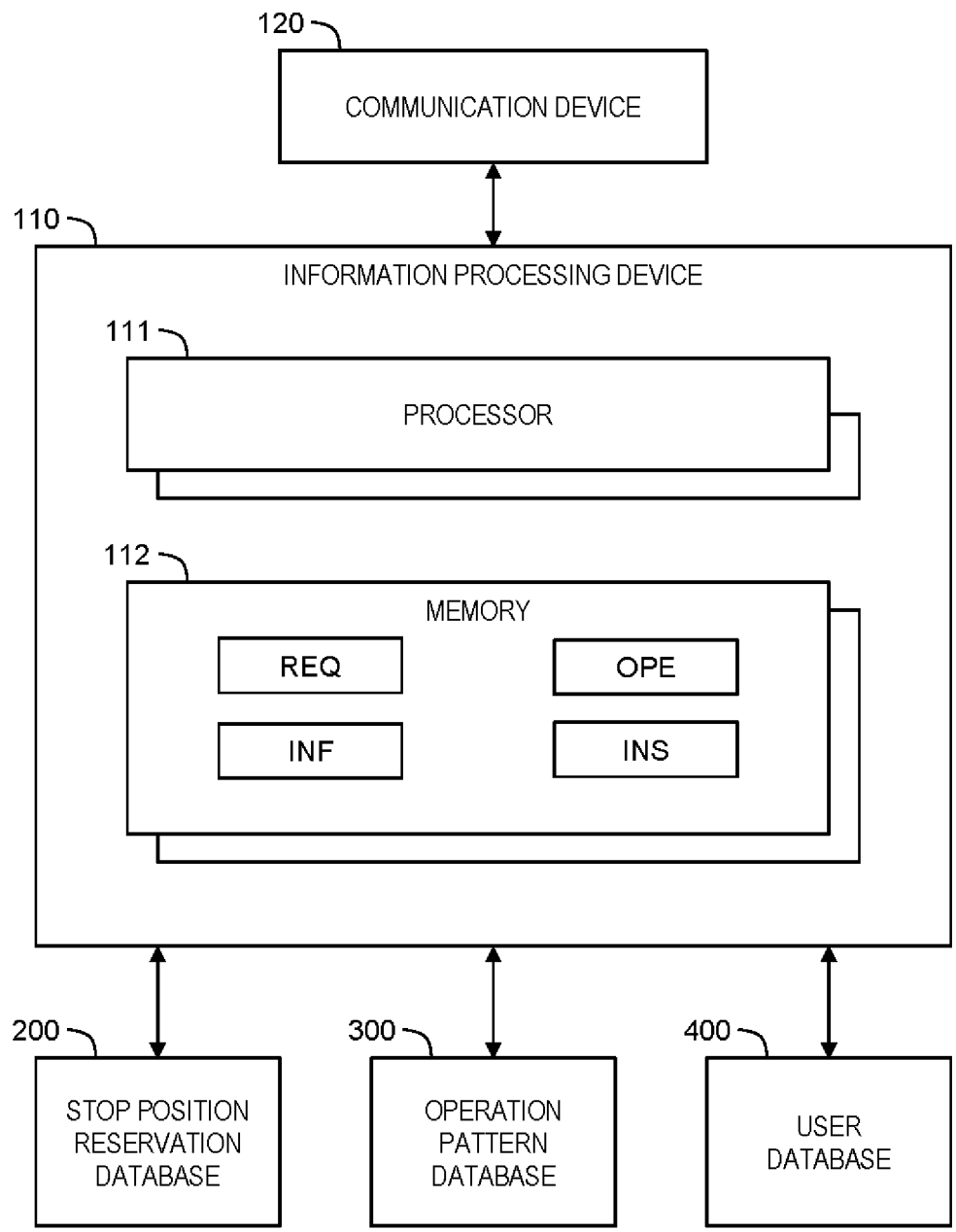
FIG. 5 is a block diagram showing a configuration example of a mobility service management system according to an embodiment of the present disclosure.

FIG. 5 is a block diagram showing a configuration example of the mobility service management system 100 according to the present embodiment. The mobility service management system 100 includes an information processing device 110, a communication device 120, a stop position reservation database 200, an operation pattern database 300, and a user database 400.

The information processing device 110 executes a variety of information processing. The information processing device 110 includes one or more processors 111 (hereinafter simply referred to as a processor 111) and one or more memories 112 (hereinafter simply referred to as a memory 112). The processor 111 executes a variety of information processing. For example, the processor 111 includes a CPU. The memory 112 stores a variety of information. Examples of the memory 112 include a volatile memory, a non-volatile memory, an HDD, an SSD, and the like. Functions of the information processing device 110 are achieved by the processor 111 executing a mobility service management program being a computer program. The mobility service management program is stored in the memory 112. The mobility service management program may be recorded on a non-transitory computer-readable recording medium. The mobility service management program may be provided via a network.

The communication device 120 communicates with the outside. For example, the communication device 120 communicates with the mobility service vehicle 10. In addition, the communication device 120 communicates with the user terminal 5.

The stop position reservation database 200 indicates the reservation status of each of the stop positions ST used in the mobility service (see FIG. 3). The stop position reservation database 200 is implemented by a storage device that is accessible by the information processing device 110.

The operation pattern database 300 indicates the operation pattern of each of the mobility service vehicles 10 used in the mobility service. The operation pattern includes at least the stop position ST via which the mobility service vehicle 10 must run and the target stop time at each stop position ST. The operation pattern may further include the operation route of the mobility service vehicle 10. The operation pattern may further include the target vehicle speed of the mobility service vehicle 10. The operation pattern database 300 is implemented by a storage device that is accessible by the information processing device 110.

The user database 400 indicates user information on each user of the mobility service. The user information includes user registration information, terminal information of the user terminal 5, reservation information, and the like.

The mobility service management system 100 is implemented, for example, by a management server. A plurality of management servers may perform distributed processing.

3-2. Reservation Acceptance Process

The information processing device 110 (the processor 111) receives the reservation request REQ from the user terminal 5 through the communication device 120. The reservation request REQ includes at least the target stop position STx and the target stop time Tx that are specified by the user X. In response to the reservation request REQ, the processor 111 executes a reservation acceptance process.

3-2-1. First Example

Figure 6:
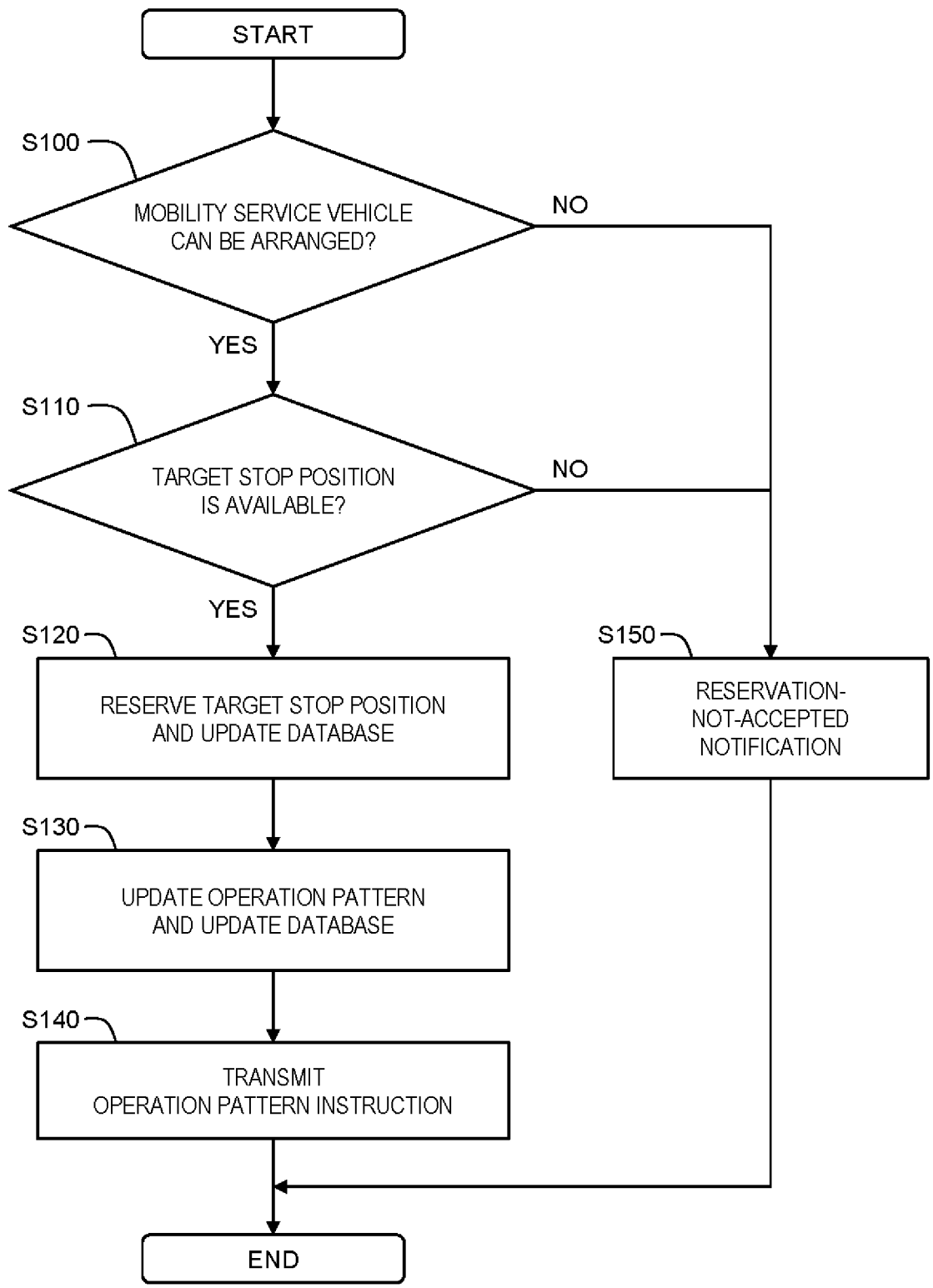
FIG. 6 is a flow chart showing a first example of a reservation acceptance process by a mobility service management system according to an embodiment of the present disclosure.

FIG. 6 is a flow chart showing a first example of the reservation acceptance process.

In Step S100, the processor 111 arranges the first mobility service vehicle 10-1 that delivers the mobility service to the user X, based on the reservation request REQ. The first mobility service vehicle 10-1 is a mobility service vehicle 10 that is capable of arriving at the target stop position STx by the target stop time Tx. For example, by referring to the operation pattern database 300, the processor 111 assigns the first mobility service vehicle 10-1 from among the mobility service vehicles 10 whose operation patterns have been already determined. As another example, the processor 111 may newly assign the first mobility service vehicle 10-1. The processor 111 sets the first operation pattern PAT1 which is the operation pattern of the first mobility service vehicle 10-1.

When the first mobility service vehicle 10-1 can be arranged (Step S100; Yes), the processing proceeds to Step S110. On the other hand, when the first mobility service vehicle 10-1 cannot be arranged (Step S100; No), the processing proceeds to Step S150.

In Step S110, the processor 111 sets the first target stop period PS1 including the target stop time Tx. Then, based on the stop position reservation database 200, the processor 111 determines whether or not the target stop position STx is available (vacant) in the first target stop period PS1. When the target stop position STx is available in the first target stop period PS1 (Step S110; Yes), the processing proceeds to Step S120. On the other hand, when there is already another reservation and thus the target stop position STx is not available in the first target stop period PS1 (Step S110; No), the processing proceeds to Step S150.

In Step S120, the processor 111 reserves the target stop position STx in the first target stop period PS1 for the first mobility service vehicle 10-1. The processor 111 reflects the reservation in the stop position reservation database 200 to update the stop position reservation database 200. At this time, the first target stop period PS1 is registered as the reservation (reserved) time in the stop position reservation database 200.

In Step S130, the processor 111 updates the first operation pattern PAT1 of the first mobility service vehicle 10-1 to update the operation pattern database 300. The first operation pattern PAT1 is set such that the first mobility service vehicle 10-1 arrives and stops at the target stop position STx within the first target stop period PS1 reserved. For example, the first operation pattern PAT1 is set such that the first mobility service vehicle 10-1 arrives and stops at the target stop position STx at the target stop time Tx. After that, the processing proceeds to Step S140.

In Step S140, the processor 111 transmits the operation pattern instruction INS to the first mobility service vehicle 10-1 through the communication device 120. The operation pattern instruction INS includes the first operation pattern PAT1 and instructs the first mobility service vehicle 10-1 to run in accordance with the first operation pattern PAT1.

On the other hand, in Step S150, the processor 111 transmits a reservation-not-accepted notification to the user terminal 5 through the communication device 120. The reservation-not-accepted notification is a kind of the service information INF. The user X receiving the reservation-not-accepted notification is able to rethink the target stop time Tx and the target stop position STx.

3-2-2. Second Example

Figure 7:
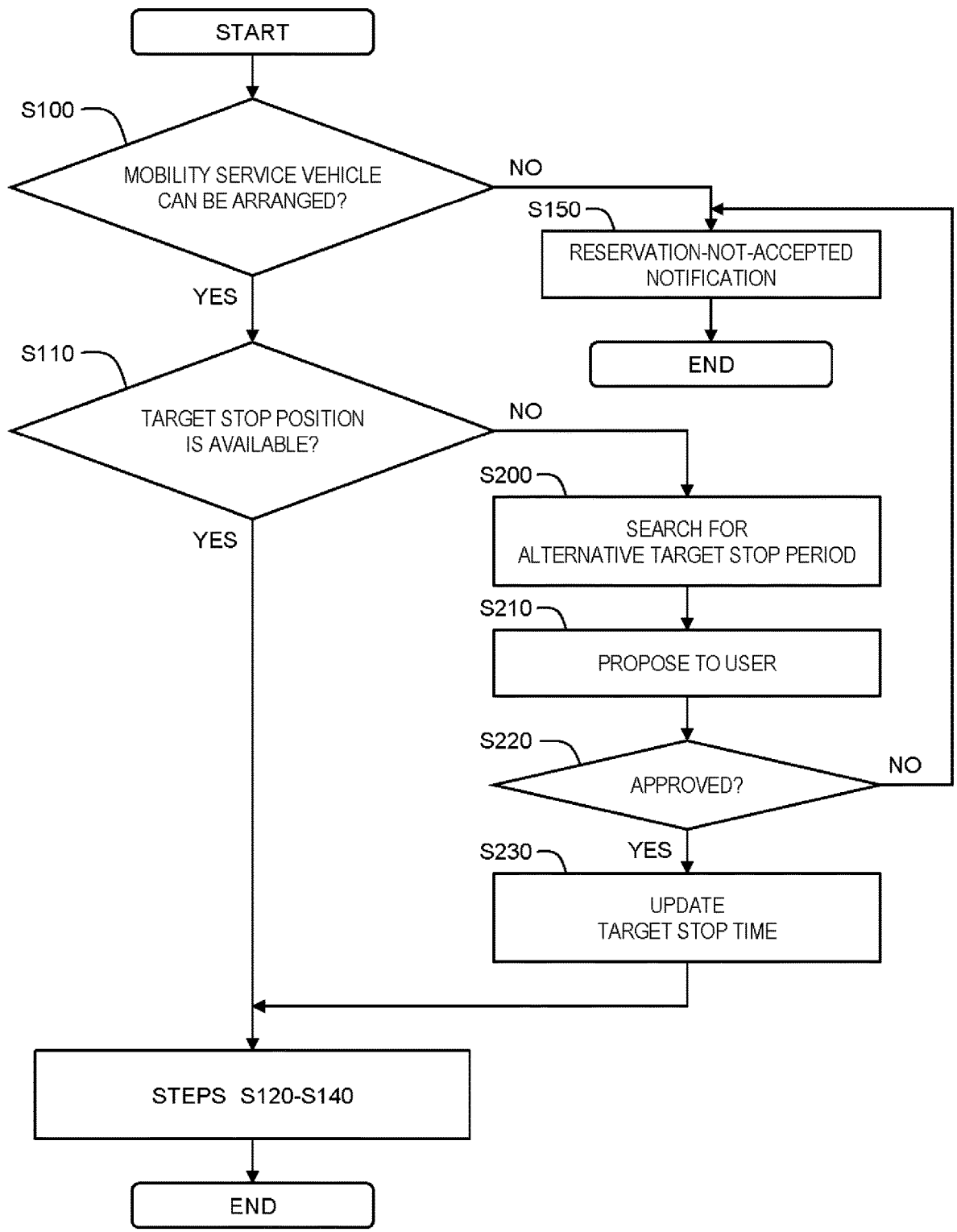
FIG. 7 is a flow chart showing a second example of a reservation acceptance process by a mobility service management system according to an embodiment of the present disclosure.

FIG. 7 is a flow chart showing a second example of the reservation acceptance process. Steps S100 to S150 are the same as in the case of the first example described above. When the target stop position STx is not available in the first target stop period PSI (Step S110; No), the processing proceeds to Step S200.

In Step S200, the processor 111 searches for an alternative target stop period PSA in which the target stop position STx is available, based on the stop position reservation database 200. It is preferable that the alternative target stop period PSA is closer to the original first target stop period PS1. The processor 111 may change the assignment of the first mobility service vehicle 10-1 in consideration of the alternative target stop period PSA.

In Step S210, the processor 111 proposes to the user X the alternative target stop time PSA or an alternative target stop time Ta included in the alternative target stop time PSA. More specifically, the processor 111 transmits a reservation change proposal notification to the user terminal 5 through the communication device 120. The reservation change proposal notification indicates the alternative target stop period PSA or the alternative target stop time Ta. The reservation change proposal notification is a kind of the service information INF.

The user X looks at the reservation change proposal notification and considers a usage in the alternative target stop period PSA or at the alternative target stop time Ta. The user X operates the user terminal 5 to approve or reject the reservation change proposal. The user terminal 5 transmits a result of selection by the user X to the mobility service management system 100. When the user X approves the reservation change proposal (Step S220; Yes), the processing proceeds to Step S230. On the other hand, when the user X rejects the reservation change proposal (Step S220; No), the processing proceeds to Step S150.

In Step S230, the processor 111 updates (sets) the target stop time Tx to the alternative target stop time Ta approved by the user X. Alternatively, the processor 111 updates (sets) the target stop time Tx to an arbitrary time included in the alternative target stop period PSA approved by the user X. A specific time included in the alternative target stop period PSA may be specified by user X. In this case, the processor 111 updates (sets) the target stop time Tx to the specific time included in the alternative target stop period PSA.

After updating the target stop time Tx, the processor 111 executes Steps S120 to S140 described above.

According to the second example, convenience for the user X is further improved.

3-3. Reservation Readjustment Process

After the reservation of the target stop position STx is completed, there is a possibility that the operation of the first mobility service vehicle 10-1 deviates from the first operation pattern PAT1 due to traffic conditions and the like. In view of the above, the information processing device 110 (the processor 111) may execute a "reservation readjustment process" that readjusts the reservation regarding the first mobility service vehicle 10-1, if necessary.

More specifically, the processor 111 acquires an "expected arrival time Te" at which the first mobility service vehicle 10-1 arrives at the target stop position STx. For example, the processor 111 receives the operation status information OPE from the first mobility service vehicle 10-1 through the communication device 120. The operation status information OPE indicates at least the current position of the first mobility service vehicle 10-1. The operation status information OPE may indicate the vehicle speed of the first mobility service vehicle 10-1. The processor 111 calculates the expected arrival time Te based on the operation status information OPE and the target stop position STx. In calculating the expected arrival time Te, traffic jam information provided from a traffic information center may be taken into consideration.

As another example, the expected arrival time Te may be calculated on the side of the first mobility service vehicle 10-1. In this case, the operation status information OPE includes the expected arrival time Te. The processor 111 acquires the expected arrival time Te from the operation status information OPE.

The processor 111 acquires the expected arrival time Te at a regular cycle (e.g., 10 seconds). As the first mobility service vehicle 10-1 comes closer to the target stop position STx, accuracy of the expected arrival time Te increases.

The processor 111 determines whether or not to execute the reservation readjustment process based on the expected arrival time Te. For example, when the expected arrival time Te is off the reserved target stop time Tx by a constant period of time or more, the processor 111 executes the reservation readjustment process. As another example, when the expected arrival time Te deviates from the first target stop period PS1 reserved, the processor 111 executes the reservation readjustment process. Various examples of the reservation readjustment process will be described below.

3-3-1. First Example

Figure 8:
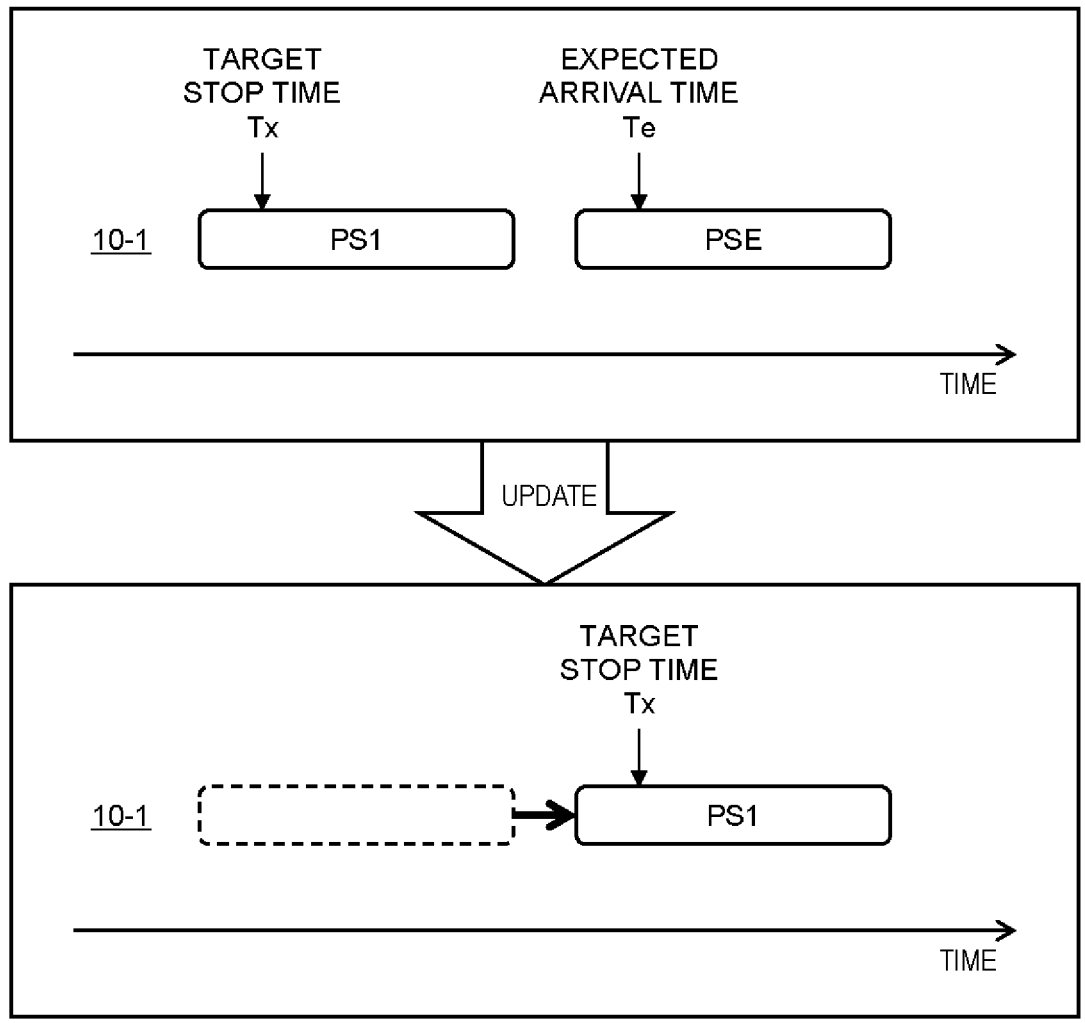
FIG. 8 is a conceptual diagram for explaining a first example of a reservation readjustment process by a mobility service management system according to an embodiment of the present disclosure.

FIG. 8 is a conceptual diagram for explaining a first example of the reservation readjustment process. The first target stop period PS1 is a target stop period including the target stop time Tx. On the other hand, an expected target stop period PSE is a target stop period including the expected arrival time Te. The processor 111 determines, based on the stop position reservation database 200, whether or not the target stop position STx is available in the expected target stop period PSE.

In the first example, there is no other reservation in the expected target stop period PSE. That is, the target stop position STx is available in the expected target stop period PSE. In this case, the processor 111 reserves the target stop position STx in the expected target stop period PSE for the first mobility service vehicle 10-1. That is, the processor 111 updates the first operation pattern PAT1 by updating the first target stop period PS1 to the expected target stop period PSE and updating the target stop time Tx to the expected arrival time Te. The processor 111 reflects the result of the reservation readjustment process in the stop position reservation database 200 and the operation pattern database 300.

3-3-2. Second Example

Figure 9:
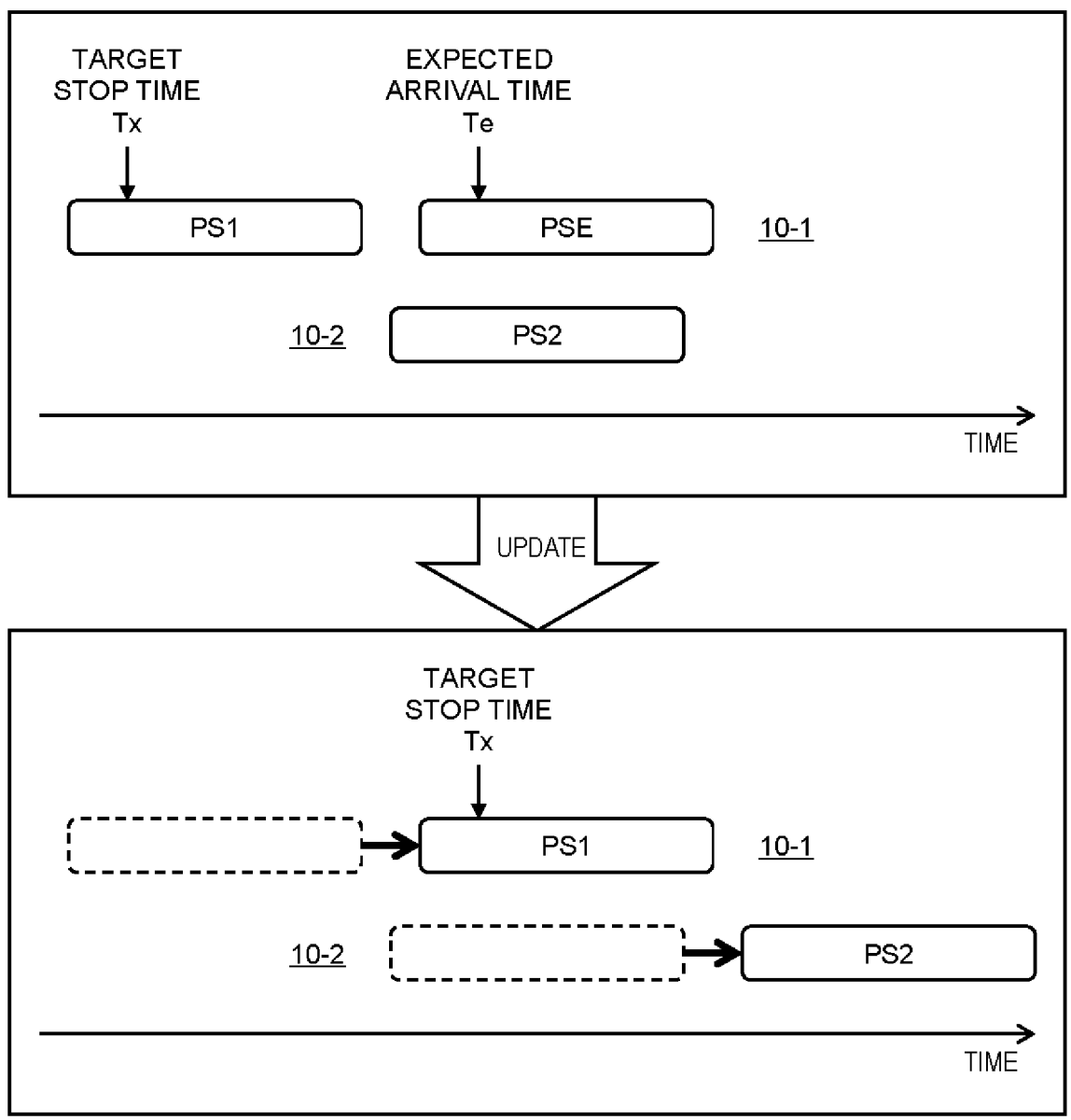
FIG. 9 is a conceptual diagram for explaining a second example of a reservation readjustment process by a mobility service management system according to an embodiment of the present disclosure.

FIG. 9 is a conceptual diagram for explaining a second example of the reservation readjustment process. The description overlapping with the first example described above will be omitted as appropriate. In the second example, there is another reservation overlapping with the expected target stop period PSE.

More specifically, a second mobility service vehicle 10-2 different from the first mobility service vehicle 10-1 runs in accordance with a second operation pattern PAT2. The second operation pattern PAT2 is set such that the second mobility service vehicle 10-2 arrives and stops at the target stop position STx within a second target stop period PS2. The target stop position STx in the second target stop period PS2 is already reserved for the second mobility service vehicle 10-2. The second target stop period PS2 and the expected target stop period PSEs at least partially overlap with each other. Therefore, it is not possible to reserve the target stop position STx in the expected target stop period PSE as it is.

In this case, the processor 111 executes the reservation readjustment process in consideration of a "priority" of each mobility service vehicle 10. For example, the priority becomes higher as publicness becomes higher. For example, the priority of a public transportation bus is higher than the priority of a private bus. As another example, the priority may become higher as a usage fee becomes higher. It should be noted that if an emergency vehicle such as an ambulance uses the stop position ST, it interrupts the mobility service system 1 according to the present embodiment. In this case, the priority of the emergency vehicle is set to the highest.

In the example shown in FIG. 9, the priority of the first mobility service vehicle 10-1 is higher than the priority of the second mobility service vehicle 10-2. In this case, the processor 111 prioritizes the reservation for the first mobility service vehicle 10-1 and changes the reservation for the second mobility service vehicle 10-2. More specifically, the processor 111 reserves the target stop position STx in the expected target stop period PSE for the first mobility service vehicle 10-1. That is, the processor 111 updates the first operation pattern PAT1 by updating the first target stop period PS1 to the expected target stop period PSE and updating the target stop time Tx to the expected arrival time Te. On the other hand, the processor 111 readjusts the second target stop period PS2 and the second operation pattern PAT2 such that the second target stop period PS2 does not overlap with the first target stop period PSI (i.e., the expected target stop period PSE).

3-3-3. Third Example

Figure 10:
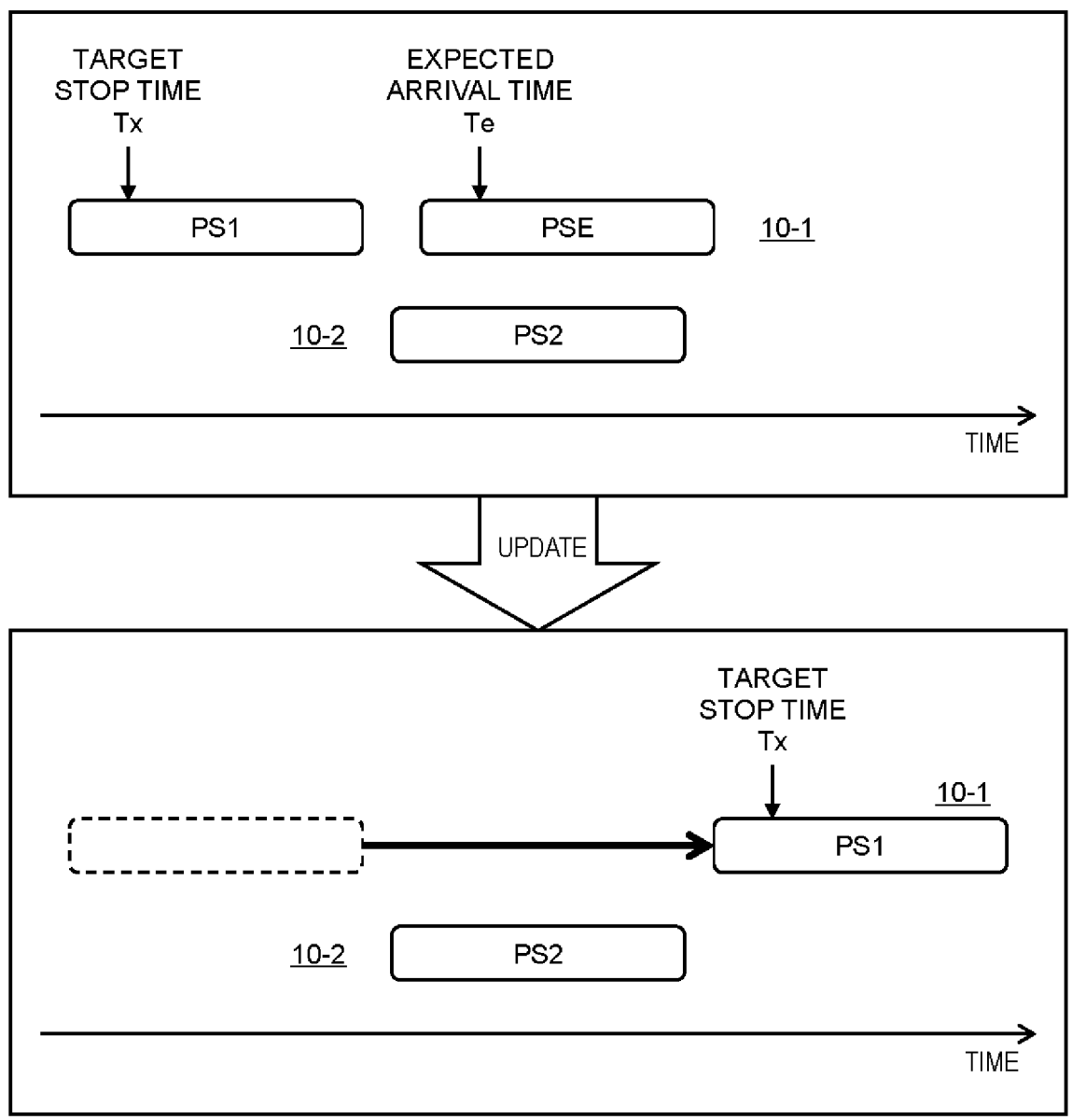
FIG. 10 is a conceptual diagram for explaining a third example of a reservation readjustment process by a mobility service management system according to an embodiment of the present disclosure.

FIG. 10 is a conceptual diagram for explaining a third example of the reservation readjustment process. The description overlapping with the second example described above will be omitted as appropriate. In the third example, the priority of the second mobility service vehicle 10-2 is higher than the priority of the first mobility service vehicle 10-1.

In this case, the processor 111 maintains the reservation regarding the second mobility service vehicle 10-2. That is, the processor 111 maintains the second operation pattern PAT2 of the second mobility service vehicle 10-2 without updating it. On the other hand, the processor 111 discards the expected target stop period PSE. Then, the processor 111 readjusts the first target stop period PS1 and the first operation pattern PAT1 such that the first target stop period PS1 does not overlap with the second target stop period PS2,

3-3-4. Fourth Example

Figure 11:
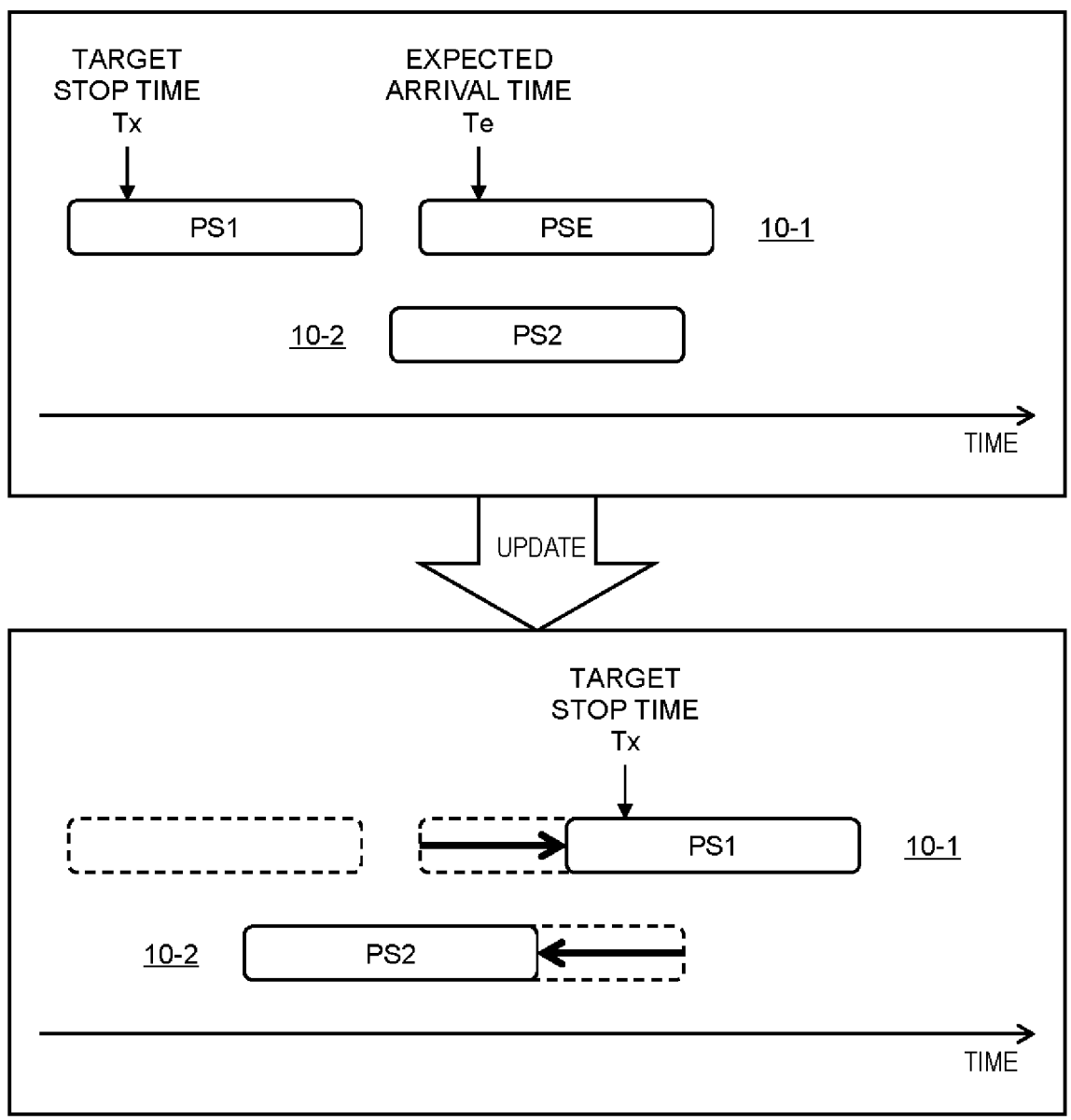
FIG. 11 is a conceptual diagram for explaining a fourth example of a reservation readjustment process by a mobility service management system according to an embodiment of the present disclosure.

FIG. 11 is a conceptual diagram for explaining a fourth example of the reservation readjustment process. The description overlapping with the second example described above will be omitted as appropriate. In the fourth example, the priority of the first mobility service vehicle 10-1 and the priority of the second mobility service vehicle 10-2 are equal to each other.

In this case, the processor 111 changes both the reservation regarding the first mobility service vehicle 10-1 and the reservation regarding the second mobility service vehicle 10-2. More specifically, the processor 111 readjusts both the first operation pattern PAT1 and the second operation pattern PAT2 by readjusting both the first target stop period PS1 and the second target stop period PS2 such that the first target stop period PS1 and the second target stop period PS2 do not overlap with each other For example, the processor 111 once sets the first target stop period PS1 to the expected target stop period PSE. At this stage, the first target stop period PS1 and the second target stop period PS2 at least partially overlap with each other. Then, the processor 111 readjusts both the first target stop period PS1 and the second target stop period PS2 such that respective adjustment widths of the first target stop period PS1 and the second target stop period PS2 are equal to each other. For example, in the example shown in FIG. 11, the first target stop period PS1 is shifted backward by a certain width, and the second target stop period PS2 is shifted forward by the same certain width.

3-3-5. Process Flow

Figure 12:
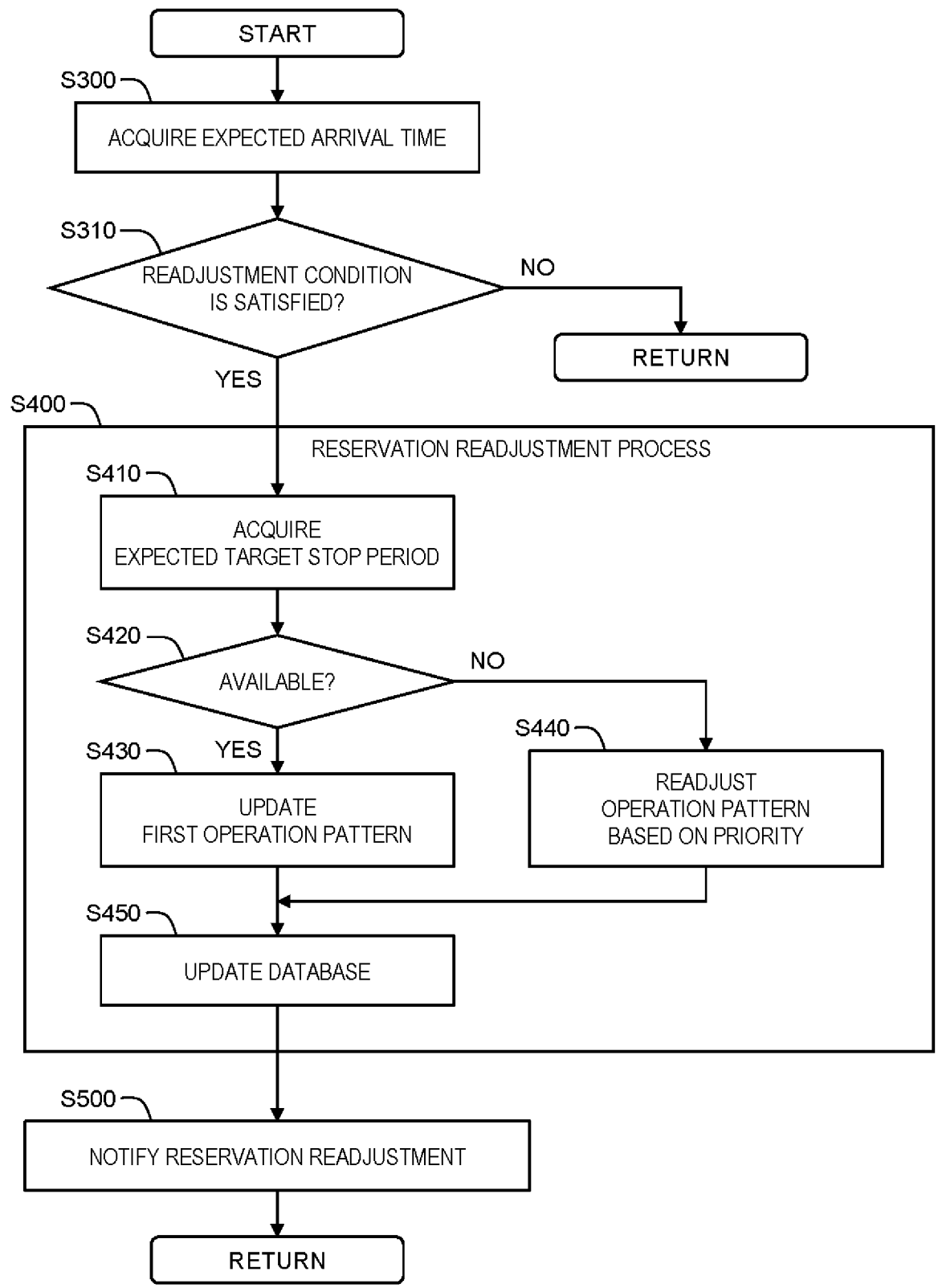
FIG. 12 is a flow chart showing processing related to a reservation readjustment process by a mobility service management system according to an embodiment of the present disclosure.

FIG. 12 is a flow chart showing processing related to the reservation readjustment process according to the present embodiment.

In Step S300, the processor 111 acquires the expected arrival time Te at which the first mobility service vehicle 10-1 arrives at the target stop position STx. The expected arrival time Te is acquired at a regular cycle (e.g., 10 seconds).

In Step S310, the processor 111 determines whether or not a readjustment condition is satisfied based on the expected arrival time Te. For example, the readjustment condition is that the expected arrival time Te is off from the reserved target stop time Tx by a constant period of time or more. As another instance, the readjustment condition is that the expected arrival time Te deviates from the first target stop period PS1 reserved. When the readjustment condition is not satisfied (Step S310; No), the processing in the current cycle ends. On the other hand, when the readjustment condition is satisfied (Step S310; Yes), the processing proceeds to Step S400.

In Step S400, the processor 111 executes the reservation readjustment process that readjusts the reservation regarding the first mobility service vehicle 10-1.

More specifically, in Step S410, the processor 111 acquires the expected target stop period PSE including the expected arrival time Te.

In Step S420, the processor 111 determines, based on the stop position reservation database 200, whether or not the target stop position STx is available in the expected target stop period PSE. When the target stop position STx is available in the expected target stop period PSE (Step S420; Yes), the processing proceeds to Step S430. Otherwise (Step S420; No), the processing proceeds to Step S440.

In Step S430, the processor 111 updates the first operation pattern PAT1 of the first mobility service vehicle 10-1 (see FIG. 8). After that, the processing proceeds to Step S450.

In Step S440, the processor 111 readjusts the operation pattern based on the priority (see FIGS. 9-11). After that, the processing proceeds to Step S450.

In Step S450, the processor 111 reflects the result of the reservation readjustment process in the stop position reservation database 200 and the operation pattern database 300. That is, the processor 111 updates the stop position reservation database 200 and the operation pattern database 300.

In Step S500, the processor 111 notifies at least the first mobility service vehicle 10-1 and the user X of the result of the reservation readjustment process. More specifically, the processor 111 transmits the operation pattern instruction INS instructing the latest first operation pattern PAT1 to the first mobility service vehicle 10-1. When the second operation pattern PAT2 is updated, the processor 111 transmits the operation pattern instruction INS instructing the latest second operation pattern PAT2 to the second mobility service vehicle 10-2. In addition, the processor 111 notifies the user terminal 5 of the result of the reservation readjustment process. As a result, the user X knows the latest target stop time Tx.

4. Others

A notification device for notifying an approach of the mobility service vehicle 10 may be installed at the stop position ST. Examples of the notification device include a lamp, a digital signage, and the like. This makes it easier for general vehicles to utilize the stop position ST during a period in which there is no use by the mobility service vehicle 10 for a while. That is, effective use of the stop position ST is promoted.

What is claimed is:

1. A mobility service management system that manages a mobility service utilizing a mobility service vehicle that runs via a plurality of predetermined stop positions along a predetermined route,
the mobility service management system comprising:
one or more processors; and
a stop position reservation database indicating a reservation status of at least one each of the plurality of predetermined stop positions, and
the one or more processors are configured to:
receive a reservation request including a target stop position and a target stop time that are specified by a user of the mobility service;
determine, based on the reservation request, a first mobility service vehicle that delivers the mobility service to the user;
determine, based on the stop position reservation database, whether or not the target stop position is available in a first target stop period including the target stop time;
when the target stop position is available in the first target stop period, reserve the target stop position in the first target stop period and update the stop position reservation database;
instruct the first mobility service vehicle to run in accordance with a first operation pattern that arrives and stops at the target stop position within the first target stop period reserved
receive operation status information indicating a current position or an expected arrival time at the target stop position from the first mobility service vehicle;
acquire, based on the operation status information, the expected arrival time at which the first mobility service vehicle arrives at the target stop position; and
when the expected arrival time is off from the target stop time by a constant period of time or more, or when the expected arrival time deviates from the first target stop period, execute a reservation readjustment process that readjusts a reservation regarding the first mobility service vehicle;
wherein
in the reservation readjustment process, the one or more processors are further configured to:
determine, based on the stop position reservation database, whether or not the target stop position is available in an expected target stop period including the expected arrival time; and
when the target stop position is available in the expected target stop period, update the first operation pattern by updating the first target stop period to the expected target stop period;
wherein:
a second mobility service vehicle different from the first mobility service vehicle runs in accordance with a second operation pattern that arrives and stops at the target stop position within a second target stop period;
when the expected target stop period overlaps with at least a part of the second target stop period and the target stop position is not available in the expected target stop period, the one or more processors are further configured to execute the reservation readjustment process based on a priority of each of the first mobility service vehicle and the second mobility service vehicle; and
when the priority of the first mobility service vehicle and the priority of the second mobility service vehicle are equal to each other, the one or more processors are further configured to readjust both the first operation pattern and the second operation pattern by readjusting both the first target stop period and the second target stop period such that the first target stop period and the second target stop period do not overlap with each other.

2. The mobility service management system according to claim 1, wherein
the one or more processors are further configured to:
when the target stop position is not available in the first target stop period, search for an alternative target stop period in which the target stop position is available based on the stop position reservation database; and
proposes to the user the alternative target stop period or an alternative target stop time included in the alternative target stop period.

3. The mobility service management system according to claim 2, wherein
the one or more processors are further configured to:

when the user approves the alternative target stop period or the alternative target stop time, update the target stop time to the alternative target stop time approved or a time included in the alternative target stop period approved.

4. The mobility service management system according to claim 1, wherein when the priority of the first mobility service vehicle is higher than the priority of the second mobility service vehicle, the one or more processors are further configured to update the first operation pattern by updating the first target stop period to the expected target stop period, and to readjust the second operation pattern such that the second target stop period does not overlap with the first target stop period.

5. The mobility service management system according to claim 1, wherein when the priority of the second mobility service vehicle is higher than the priority of the first mobility service vehicle, the one or more processors are further configured to readjust the first operation pattern such that the first target stop period does not overlap with the second target stop period, without updating the second operation pattern.

6. The mobility service management system according to claim 1, wherein
the one or more processors are further configured to set the first target stop period to the expected target stop period and then readjust both the first target stop period and the second target stop period such that respective adjustment widths of the first target stop period and the second target stop period are equal to each other.

\* \* \* \* \*